United States Patent [19]

Haydon

[11] 4,087,709

[45] May 2, 1978

[54] ELECTRIC ROTATING MACHINE

[75] Inventor: Arthur W. Haydon, Breakneck Hill, Conn.

[73] Assignee: Tri-Tech, Inc., Waterbury, Conn.

[21] Appl. No.: 649,739

[22] Filed: Jan. 16, 1976

Related U.S. Application Data

[63] Continuation-in-part of Ser. No. 495,929, Aug. 8, 1974, abandoned.

[51] Int. Cl.² ............................................... H02K 7/10
[52] U.S. Cl. ..................................... 310/83; 310/156; 310/172; 310/216
[58] Field of Search .................... 310/71, 156, 172, 43, 310/162–165, 216–218, 83

[56] References Cited

U.S. PATENT DOCUMENTS

| | | | |
|---|---|---|---|
| 2,709,762 | 5/1955 | Naul | 310/172 |
| 3,475,630 | 10/1969 | Heinzen et al. | 310/43 |
| 3,558,940 | 1/1971 | Chesnut et al. | 310/83 X |
| 3,564,314 | 2/1971 | Haydon | 310/172 |

OTHER PUBLICATIONS

Standard Handbook for Electrical Engineers, Knowlton, p. 324, McGraw-Hill (1957).

*Primary Examiner*—Donovan F. Duggan
*Attorney, Agent, or Firm*—Lee C. Robinson, Jr.

[57] ABSTRACT

An electric motor or other electric rotating machine in which certain of the stator poles are of hardened magnetic material to provide the machine with a unidirectional self-starting characteristic. In certain preferred embodiments the housing for the motor is of nonconductive material, and two of the stator pole pieces protrude through the housing and serve as electrical terminals. The housing encloses a spool or bobbin which supports the energizing winding for the motor as well as a reduction gear train which advantageously is mounted on one of the flanges of the bobbin.

11 Claims, 7 Drawing Figures

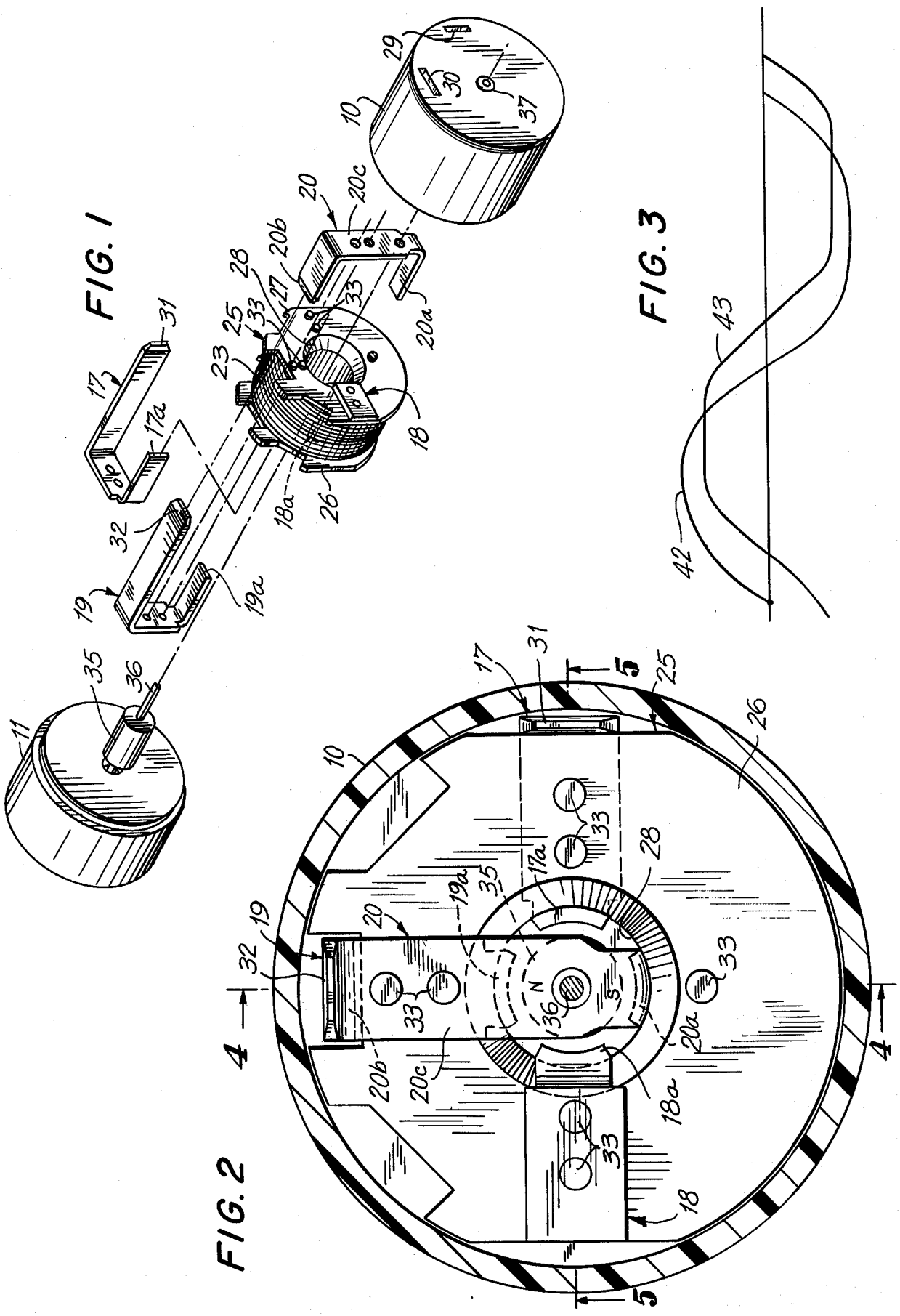

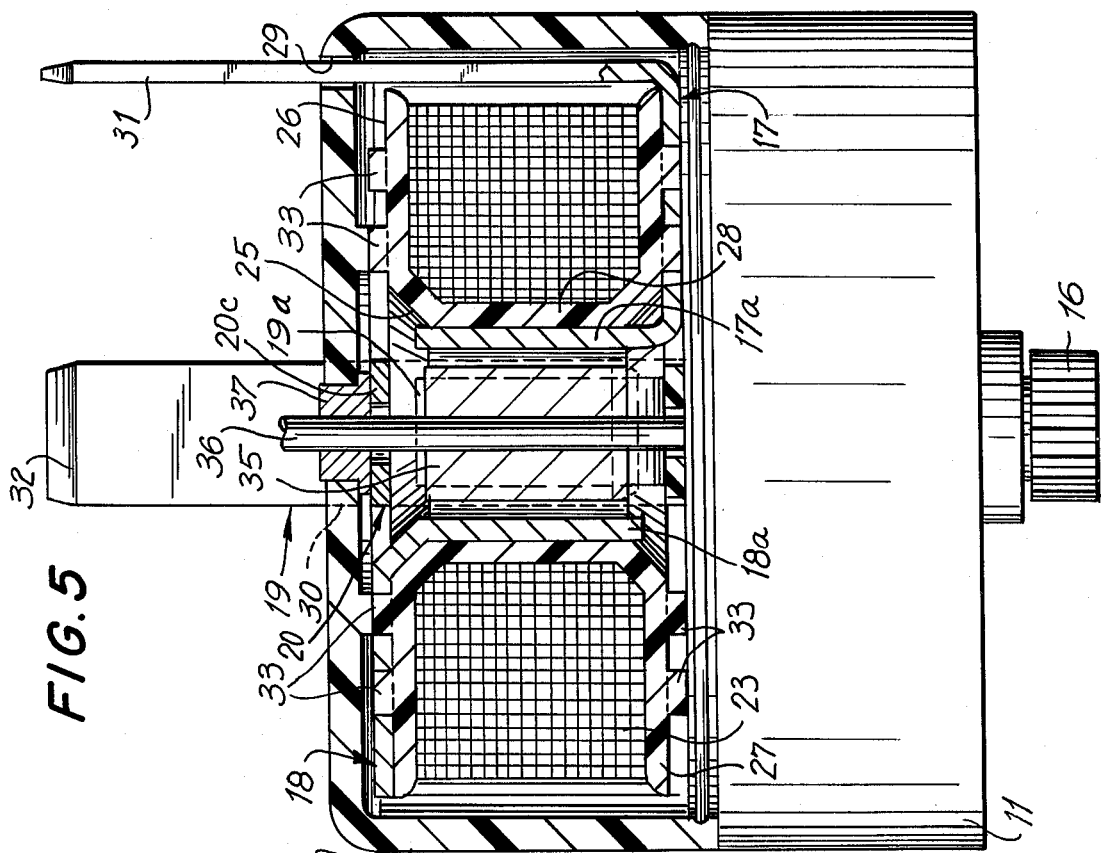
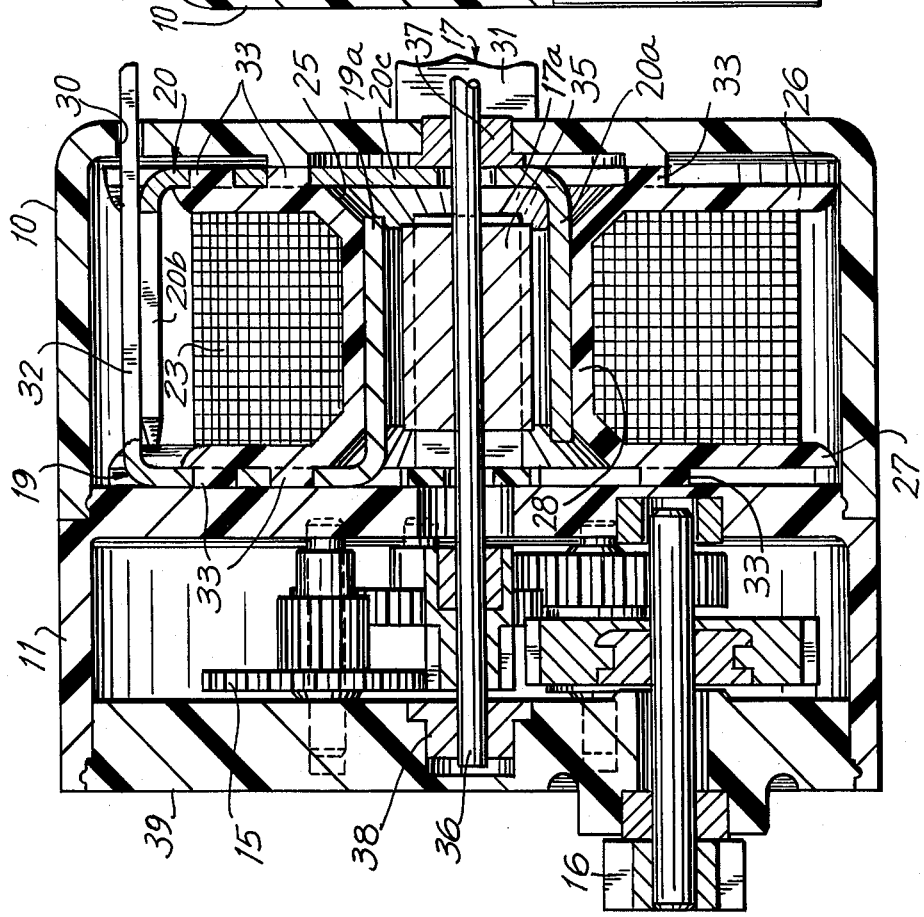

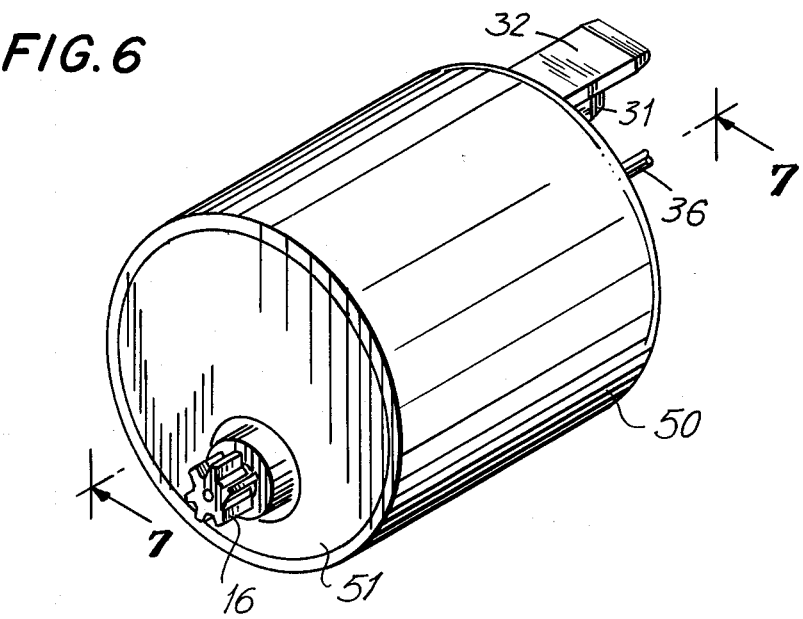
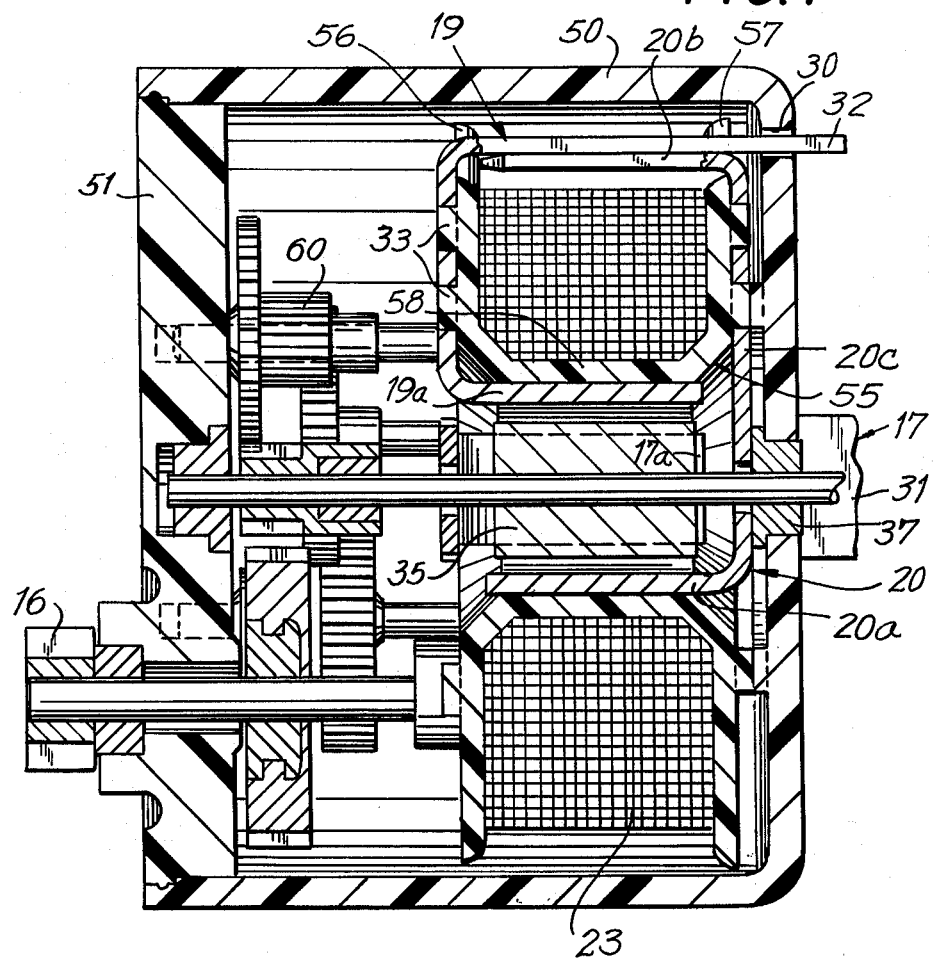

4,087,709

ELECTRIC ROTATING MACHINE

CROSS-REFERENCE TO RELATED APPLICATION

This is a continuation-in-part of copending U.S. application Ser. No. 495,929 filed Aug. 8, 1974 by Arthur W. Haydon. This copending application has been permitted to become abandoned in favor of the present case.

BACKGROUND OF THE INVENTION

This invention relates to electric rotating machines and more particularly to unidirectional synchronous and stepper motors.

The present invention, while of general application, is particularly well suited for use in frictional horse power motors. Certain illustrative motors of this general class are disclosed in Arthur W. Haydon U.S. Pat. Nos. 3,909,646 granted Sept. 30, 1975; 3,495,113 granted Feb. 10, 1970; 3,495,111 also granted Feb. 10, 1970 and 3,564,214 granted Feb. 16, 1971; and Arthur W. Haydon and John J. Dean U.S. Pat. No. 3,770,998 granted Nov. 6, 1973.

One problem which has existed in the design of electric motors and other electric rotating machines, including those of the foregoing type, was the added manufacturing cost and complexity resulting from the need for providing shading rings of other ancillary devices to insure that the rotor of the motor uniformly and consistently began rotating in a prescribed direction upon energization of the field coil. Previous attempts to simplify the design by eliminating such shading devices resulted in a motor that either did not have a unidirectional starting characteristic or necessitated a mechanical ratchet mechanism (called a "no-back" device) in order to prevent the rotor from rotating in the wrong direction. The design of prior unidirectional motors, already overly complex, was further complicated in various other respects, and the motors included an unnecessarily large number of component parts which were difficult and expensive to manufacture and assemble.

SUMMARY

One general object of this invention, therefore, is to provide a new and improved electric motor or other electric rotating machine.

More specifically, it is an object of this invention to provide an electric rotating machine which has a unidirectional starting characteristic.

Another object of the invention is to provide an electric rotating machine which is readily adaptable for connection to an external power supply.

Still another object of the invention is to provide an electric motor utilizinng comparatively simple mechanical and electrical components which is economical to manufacture and thoroughly reliable in operation.

In one illustrative embodiment of the invention, there is provided a motor or other electric rotating machine having a bobbin-supported energizing winding for producing magnetic flux and a nonconductive housing around the winding. Also carried within the housing is a generally cylindrical stator structure which includes two pairs of opposed salient stator poles in magnetic flux relationship with a cylindrical permanently magnetized rotor. the rate of build-up of the flux in certain of the stator poles, upon energization of the winding, is carefully controlled to insure that the rotor substantially instantaneously begins its rotation in a prescribed direction.

In accordance with one feature of the invention, at least one and preferably two of the salient stator poles of the motor are of hardened magnetic material. The hardened material produces a flux lag with respect to the remaining stator poles, when the winding is energized, to ensure that the rotor begins rotating in the prescribed direction.

In accordance with another feature of the invention, in certain particularly important embodiments, two of the stator pole pieces are of generally U-shaped configuration and are provided with integral extensions which form the electrical terminals of the motor. These extensions protrude through the nonconductive housing and serve as rigid connectors which may be readily attached to suitable AMP terminals or other connecting devices.

In accordance with a further feature of some embodiments of the invention, the motor includes a plurality of reduction gears which are carried by one of the flanges of the bobbin for the energizing winding. With this arrangement, there no longer is a need for a separate gear box, and the overall construction of the motor is greatly simplified.

The present invention, as well as further objects and features thereof, will be more fully understood from the following description of certain preferred embodiments, when read with reference to the accompanying drawings.

BRIEF DESCRIPTION OF THE DRAWINGS

FIG. 1 is an exploded perspective view of an alternating current synchronous motor in accordance with one illustrative embodiment of the invention.

FIG. 2 is a transverse sectional view of the motor illustrated in FIG. 1.

FIG. 3 is a schematic diagram illustrating the relationship between the magnetic flux in the stator poles of the motor.

FIG. 4 is a sectional view taken along the line 4—4 in FIG. 2.

FIG. 5 is a sectional view taken along the line 5—5 in FIG. 2 with certain portions shown in elevation.

FIG. 6 is a perspective view of an alternating current synchronous motor in accordance with another illustrative embodiment of the invention.

FIG. 7 is a sectional view similar to FIG. 4 but showing the motor of FIG. 6.

DESCRIPTION OF CERTAIN PREFERRED EMBODIMENTS

Referring to the perspective view of FIG. 1, there is shown an alternating current synchronous motor having a cup-shaped cover or housing 10 and a coaxial gear box 11 of cylindrical configuration. The housing 10 and the gear box 11 are each of plastic or other nonconductive, nonmagnetic material and are arranged in snap-fitting relationship with each other to form a compact cylindrical structure. The gear box 11 encloses a series of reduction gears 15 (FIG. 4) to provide an appropriate speed reduction at an output pinion 16.

The motor includes a cylindrical stator structure within the housing 10 which comprises four pole piece stampings 17, 18, 19 and 20. These pole pieces respectively include integral nonlaminated salient stator poles 17a, 18a, 19a and 20a which are of the same magnetic material and are arranged in a cylindrical array in equidistant relationship with the rotational axis of the motor. The stator poles 17a and 18a are of conventional cold rolled steel or other comparatively soft magnetic material, while the stator poles 19a and 20a are fabricated from steel which has been hardened by heat treatment. Thus, the pole pieces 19 and 20 which form the poles 19a and 20a may be heated to a temperature of, say, 1200° F and then quenched in water, for example, to provide the desired hardening effect.

The soft stator poles 17a and 18a are disposed in opposed relationship with each other within an energizing winding 23. The hardened stator poles 19a and 20a also are located in opposed relationship within the winding 23 and advantageously are spaced from the stator poles 17a and 18a by an angle which approximates 90° and may range between 45° and 90°. The winding 23 is supported on a spool or bobbin 25 having a pair of flanges 26 and 27 and a central hub 28.

The stator pole pieces 17 and 19 are of U-shaped configuration. The stator pole portions 17a and 19a of these pole pieces are located within the bobbin hub 28 and are parallel to the axis of the motor. The pole pieces 17 and 19 extend radially from the portions 17a and 19a along the outer face of the flange 26, and they then proceed parallel to the motor axis along the outside of the winding 23 and through corresponding slots 29 and 30 in the nonconductive housing 10 to form pole piece extensions 31 and 32, respectively. The two end leads of the winding 23 are soldered or otherwise electrically connected to the pole pieces 17 and 19 with the result that the extensions 31 and 32 may be used as the electrical terminals for the motor.

The stator pole piece 18 is generally L-shaped with one leg of the "L" forming the stator pole 18a and the other leg extending in a radial direction. The stator pole piece 20, on the other hand, is of U-shaped configuration and includes, in addition to the stator pole 20a which forms one leg of the "U", a second leg 20b on the outside of the winding 23 and an interconnecting radial portion 20c in facing relationship with the outer face of the bobbin flange 27.

A series of bosses 33 are integrally molded on the outer faces of the flanges 26 and 27 on the bobbin 25. These bosses protrude through mating apertures in the pole pieces 17, 18, 19 and 20 to hold the pole pieces in their proper positions.

In the embodiment of FIGS. 1-5 the stator structure of the motor includes only a single pair of opposed salient stator poles 17a and 18a of soft magnetic material and only a single pair of opposed salient stator poles 19a and 20a of hardened magnetic material. Each of the poles 17a, 18a, 19a and 20a is in magnetic flux relationship with a rotor 35. The rotor 35 is in the form of a comparatively long, thin cylinder of ceramic magnetic material which is permanently magnetized with but a single pair of opposite north and south poles. The rotor material is relatively "hard" to provide high coercivity, low permeability, a high magnetic energy product and a low specific gravity. Representative examples of such materials are Ceramagnetic A, A19 and A70 manufactured by Stackpole Carbon Company, Electric Components Division, Saint Marys, Pa. and Indox I and Indox V manufactured by Indiana General Corporation, Valparaiso, Ind. Such materials are of barium ferrite having a composition $BaFe_{12}O_{19}$. Another suitable material is Plastiform available from the Leyman Division of Minnesota Mining & Manufacturing Company, Cincinnati, Ohio. The rotor also may be produced from a 77% platinum, 23% cobalt material made by the Hamilton Watch Company of Lancaster, Pa. This latter material has a residual induction of 6,400 gauss, a coercive force of 4,300 oersteds and a maximum energy product of 9.0 $\times 10^6$ gauss-oersteds. Another particularly advantageous rotor material having an even higher energy product is samarium cobalt, also commercially available at the present time.

The rotor 35 includes an axial hole into which a shaft 36 is secured as by cementing, molding or other suitable techniques. As best shown in FIG. 4, the shaft 36 is rotatably supported between two bearing members 37 and 38 which are centrally located in the circular wall of the housing 10 and in an end plate 39 for the gear box 11, respectively. In some embodiments, particularly where Plastiform is used as the rotor material, a series of comparatively thin washers of the material are placed in stacked relationship with each other on the shaft 36 and are adhesively held together to form the rotor. In other advantageous arrangements the Plastiform material may be rolled in sheet form, slit and ground, or it may be extruded in tubular form, cut to length and pressed on the shaft.

The use of a long rotor increases the torque available to operate the motor. A comparatively high torque is produced when the ratio of rotor length to diameter exceeds about 1.25:1. The net usable torque falls off rapidly when this ratio approaches 1:1. In addition, by maintaining the ratio at least about 1.25:1 the low inertia of the rotor enables substantially instantaneous starting and stopping. This latter feature is particularly advantageous in cases in which the motor is used for intermittent timing operations or for other applications where it is desired to avoid the introduction of a cumulative error in the position of the rotor shaft after repeated starts and stops.

In cases in which the motor of FIGS. 1-5 is used as an alternating current synchronous motor, an AC signal, illustratively 110 volts at a frequency of 60 Hz., is applied across the energizing winding 23 by means of the pole piece terminals 31 and 32. The winding 23 produces magnetic flux to magnetize each of the salient stator poles 17a, 18a, 19a and 20a alternately north and south. The thus magnetized stator poles cooperate with the north and south poles of the rotor 35 to drive the rotor at synchronous speed.

The magnetic flux in the soft stator poles 17a and 18a follows the incoming AC signal and is illustrated schematically by the curve 42 in FIG. 3. Because of the hardened material used for the stator poles 19a and 20a, the flux in these latter poles lags the flux in the soft poles 17a and 18a in the manner shown by the curve 43. Thus, upon energization of the winding 23, the flux in the poles 17a and 18a begins to build up almost instantaneously, while initially there is little or no flux in the poles 19a and 20a. When the voltage across the winding 23 reaches approximately seventy-five percent of line voltage, the flux in the hardened poles 19a and 20a begins its build-up and reaches a maximum value shortly before the input voltage peaks at the end of the first one quarter cycle. The arrangement is such that, from the time of the initial energization of the winding 23, the rate of flux build-up in the hardened poles is substantially less than that in the soft poles. The hardened pole flux continues at its maximum value, which in most cases is somewhat less than the maximum value of the flux in the soft poles, until after the soft pole flux begins to decrease and reverse for the next alternation. The flux from the hardened poles remains in lagging relationship with respect to the soft pole flux at all times.

When the winding 23 is deenergized, the flux in the soft stator poles 17a and 18a drops substantially instantaneously to zero. A degree of residual magnetism remains, however, in the hardened stator poles 19a and 20a, with the result that the quiescent condition of the motor one of the hardened poles is of north magnetic polarity and the other hardened pole is of south magnetic polarity. This residual magnetism causes the rotor 35 to assume a quiescent stopping position in which each of the nonsalient rotor poles is opposite one of the hardened stator poles 19a and 20a.

When the winding 23 is again energized, the rotor 35 immediately begins rotating in a predetermined direction. Referring to FIG. 2, for example, the quiescent position of the rotor is such that its north magnetic pole is opposite the hardened stator pole 19a and its south magnetic pole is opposite the hardened stator pole 20a. If the soft stator pole 17a initially is of south magnetic polarity when the winding is energized,, the pole 17a attracts the north pole of the rotor, and the rotor begins its rotation in a clockwise direction. If, on the other hand, the soft pole 17a initially is of north magnetic polarity, the rotor turns through an angle of slightly more than 90° in a counterclockwise direction and then, as the polarity of the stator poles changes upon the completion of the first one-half cycle, reverses direction and begins its clockwise rotation.

The effect of the hardened stator poles 19a and 20a in achieving unidirectional rotation of the rotor 35 is much the same as that of the shaded stator poles disclosed in the above Haydon U.S. Pat. No. 3,495,113 and 3,564,314. One additional advantage of the hardened poles over the use of shaded poles is that the residual magnetism in the hardened poles positions the rotor in its most favorable location for starting. The degree of flux lag in the hardened poles may be controlled, to some extent, by the degree of hardness imparted to the poles through heat treatment.

To provide even better unidirectional characteristics, in some embodiments the hardened poles 19a and 20a may be shifted such that they form an angle with respect to the soft stator poles 17a and 18a which lies between about 45 electrical degrees and about 60 electrical degrees. In these embodiments and for a four pole motor of the type illustrated in FIG. 2, the angular relationship between the center lines of the two sets of poles is approximately 45 mechanical degrees to 60 mechanical degrees. If the spacing between the poles is less than about 45°, the power output of the motor drops off substantially, while for a spacing in excess of about 60° the motor on occasion may begin rotating in the reverse direction.

The magnetic reluctance of the plastic housing 10 and gear box 11 approximates that of air. Conventional practice is to produce these components from steel or other electrically conductive magnetic material in order to maintain the reluctance of the path for the stator pole flux at a minimum and thus operate the motor at optimum efficiency. But with a nonmagnetic housing and gear box in combination with the use of hardened stator poles as taught by the present invention, the motor also exhibits good efficiency as well as substantially better starting and running characteristics than prior motors with magnetic return paths for the stator pole flux. The nonconductive characteristics of the housing greatly facilitate the use of the stator pole pieces 17 and 19 as the electrical input terminals for the motor.

At any given movement during the operation of the motor, the soft stator poles 17a and 18a are of opposite magnetic polarity, as are the hard stator poles 19a and 20a. The flux follows a path from a stator pole of one polarity, across the rotor to a stator pole of opposite polarity then along this latter pole, and then back through the ambient atmosphere to the first pole. In spite of the fact that a portion of this return path for each stator pole has a substantially higher reluctance than that of conventional motors, the rotor produces surprisingly high output torque and continues to rotate until the field coil is de-energized. In addition, the return path for the soft stator poles 17a and 18a has a greater air gap and hence a higher reluctance than the return path for the hard stator poles 19a and 20a. The increased reluctance of the soft stator pole return path tends to counterbalance the normally high reluctance of the hard stator poles, and the overall efficiency of the motor is further increased.

Referring now to FIGS. 6 and 7, there is shown an electric motor which is similar in its mode of operation to the motor of FIGS. 1-5 but which avoids the need for a separate gear box for the reduction gear train. The motor of FIGS. 6 and 7 includes the cylindrical stator structure having the pole pieces 17, 18, 19 and 20 and the winding 23 of the earlier disclosed motor as well as the permanently magnetized nonsalient pole rotor 35. Contrary to the earlier motor, however, the motor of FIGS. 6 and 7 is provided with a comparatively deep cover or housing 50 of plastic or other nonmagnetic, nonconductive material. With the exception of the output pinion 16 and the pole piece extensions 31 and 32, the housing 50 encloses all of the component parts of the motor. The open end of the housing is closed by a circular end plate 51.

The energizing winding 23 of the motor is supported by a bobbin indicated generally at 55. The bobbin 55 is provided with two opposed flange portions 56 and 57 and a central hub 58 which serves as a core for the winding.

As best shown in FIG. 7, a plurality of reduction gears 60 are rotatably mounted directly on the outer face of the bobbin flange 56. These gears serve to interconnect the rotor 35 and the output pinion 16 to provide the desired speed reduction at the pinion. The flange 56 thus serves as a common wall between the winding 23 and the reduction gears 60 avoids the necessity for enclosing the gears within a separate gear box or other structural element.

Each of the illustrated embodiments of the invention also may be operated as a stepper motor to drive the rotor through a single complete revolution in response to each direct current pulse applied to the energizing winding. To achieve this result, one of the opposed pairs of salient stator poles may be permanently magnetized to provide respective north and south poles. A convenient way of accomplishing this is to attach strips of permanently magnetized Plastiform to the inner surfaces of, say, the hardened poles 19a and 20a. With this arrangement the rotor has only a single quiescent position in which the north pole of the rotor is opposite the permanently magnetized south stator pole and the south pole of the rotor is opposite the permanently magnetized north stator pole.

In the various illustrated embodiments, the stator structure of the motor includes only a single pair of opposed salient stator poles of soft magnetic material and only a single pair of opposed salient stator poles of hardened magnetic material in magnetic flux relationship with the rotor. To simplify the motor design even further, in other advantageous arrangements the stator structure has only a single salient stator pole of soft magnetic material and only a single salient stator pole of hardened magnetic material. The two poles are spaced apart by approximately ninety degrees and are arranged in a manner similar to, say, the soft stator pole 17a and the hardened stator pole 19a in FIG. 2. Upon the energization of the field coil for the motor, the flux in the hardened pole lags that in the soft pole in the manner described above and shown schematically in FIG. 3 to provide the motor with a unidirectional starting characteristic. When the field coil is deenergized, the rotor consistently assumes a position with one of its nonsalient poles opposite the hardened stator pole and displaced from the soft stator pole, so that when the coil is again energized, the rotor is self-starting.

The rotors described above are each in the form of a comparatively long narrow cylinder which is permanently magnetized with only a single pair of nonsalient rotor poles. The rotor cooperates with one or more pairs of salient stator poles to provide particularly good operating characteristics and a high output torque.

The terms and expressions which have been employed are used as terms of description and not of limitation, and there is no intention, in the use of such terms and expressions, of excluding any equivalents of the features shown and described or portions thereof, it being recognized that various modifications are possible within the scope of the invention claimed.

What is claimed is:

1. An electric rotating machine comprising, in combination:
    means including an energizing winding for producing magnetic flux;
    a bobbin for supporting said energizing winding;
    a rotor having permanently magnetized north and south rotor poles;
    gear train means connected to said rotor, said gear train means including a plurality of gears separately supported directly on said bobbin;
    a stator structure disposed about the rotor and including at least one salient stator pole of soft magnetic material and at least one salient stator pole of hardened magnetic material in magnetic flux relationship with the rotor, the hardened stator pole being angularly spaced by approximately 90 mechanical degrees from the soft stator pole, the stator poles being supplied with magnetic flux from the energizing winding such that, upon energization of said winding, the rate of flux build-up in the hardened pole is less than that in the soft pole, to provide the machine with a unidirectional starting characteristic; and
    a housing of nonmagnetic material disposed about the energizing winding, the magnetic stator flux from the soft stator pole following a nonmagnetic return which extends across said rotor directly to another of said stator poles and then back through the housing and the surrounding atmosphere to said soft pole.

2. An electric rotating machine comprising, in combination:
    a cylindrical rotor having a plurality of rotor poles; and
    a stator structure including an energizing winding, a pair of opposed salient stator poles of soft magnetic material and a pair of opposed salient stator poles of hardened magnetic material in a magnetic flux relationship with the rotor, the stator poles being supplied with magnetic flux from the energizing winding such that, upon energization of said winding, the rate of flux build-up in the hardened poles is less than that in the soft poles, two of the stator poles having extensions thereon which form the electrical terminals of the machine.

3. An electric rotating machine as defined in claim 2, in which the hardened stator poles are angularly spaced around the rotor with respect to the soft stator poles.

4. An electric rotating machine comprising, in combination:
    means including an energizing winding for producing magnetic flux;
    a housing of nonmagnetic material disposed about the energizing winding;
    a cylindrical rotor having permanently magnetized north and south nonsalient poles and an axial length greater than its diameter;
    a stator structure disposed about the rotor and including four salient stator poles of the same magnetic material but of different heat treatment, the salient stator poles comprising only a single pair of opposed salient stator poles of soft magnetic material and only a single pair of opposed salient stator poles of hardened magnetic material in magnetic flux relationship with the rotor, the stator poles being supplied with magnetic flux from the energizing winding such that, upon energization of said winding, the rate of flux build-up in the hardened poles is less than that in the soft poles, the magnetic stator flux from each of the soft stator poles following a nonmagnetic return which extends across said rotor directly to the other soft stator poles and then back through the housing and the surrounding atmosphere to the first soft pole;
    a bobbin for supporting the energizing winding; and
    a plurality of reduction gears rotatably mounted directly on the bobbin in driven relationship with the rotor.

5. An electric rotating machine comprising, in combination:
    means including an energizing winding for producing magnetic flux;
    a housing of nonconductive material disposed about the energizing winding;
    a rotor having a plurality of rotor poles; and
    a stator structure disposed about the rotor and including pairs of oposed salient stator poles in magnetic flux relationship with the rotor, two of the stator poles protruding through the housing and forming the electrical terminals of the machine, the stator poles being supplied with magnetic flux from the energizing winding such that, upon energization of said winding, the rate of flux build-up in selected ones of the stator poles is less than that in the remaining stator poles.

6. An electric rotating machine as defined in claim 5, in which said two stator poles are of U-shaped configuration.

7. An electric motor comprising, in combination:
    means including an energizing winding for producing magnetic flux;
    bobbin means for supporting the energizing winding;

a housing disposed about the energizing winding;
a cylindrical rotor having permanently magnetized north and south rotor poles;
a plurality of reduction gears separately journalled directly on the bobbin means in driven relationship with the rotor; and
a stator structure disposed about the rotor and including four salient stator poles of the same magnetic material but of different heat treatment, the salient stator poles comprising a pair of opposed salient stator poles of soft magnetic material and a pair of opposed salient stator poles of hardened magnetic material in magnetic flux relationship with the rotor, the hardened stator poles being angularly spaced from the soft stator poles, the stator poles being supplied with magnetic flux from the energizing winding such that, upon energization of said winding, the rate of flux build-up in the hardened poles is less than that in the soft poles, to provide the machine with a unidirectional starting characteristic, the magnetic stator flux from each of the soft stator poles following a nonmagnetic return which extends across said rotor directly to the other soft stator pole and then back through the housing and the surrounding atmosphere to the first soft pole.

8. An electric motor comprising, in combination:
means including an energizing winding for producing magnetic flux;
bobbin means for supporting the energizing winding;
a housing disposed about the energizing winding;
a cylindrical rotor having permanently magnetized north and south poles, the rotor having an axial length greater than its diameter;
a plurality of reduction gears journalled on the bobbin means in driven relationship with the rotor; and
a stator structure disposed about the rotor and including four salient stator poles of the same magnetic material but of different heat treatment, the salient stator poles comprising a pair of opposed salient stator poles of soft magnetic material and a pair of opposed salient stator poles of hardened magnetic material in magnetic flux relationship with the rotor, the hardened stator poles being angularly spaced from the soft stator poles, the stator poles being supplied with magnetic flux from the energizing winding such that, upon energization of said winding, the rate of flux build-up in the hardened poles is less than that in the soft poles, to provide the machine with a unidirectional starting characteristic, the magnetic stator flux from each of the soft stator poles following a nonmagnetic return which extends across said rotor directly to the other soft stator pole and then back through the housing and the surrounding atmosphere to the first soft pole.

9. An electric rotating machine comprising, in combination:
means including an energizing winding for producing magnetic flux;
bobbin means for supporting the energizing winding, the bobbin means having at least one flange portion and a central hub;
a housing of nonmagnetic, nonconductive material disposed about the energizing winding;
a rotor having north and south rotor poles and an axial length greater than its diameter;
a plurality of reduction gears rotatably mounted directly on the flange portion of the bobbin means in driven relationship with the rotor; and
a stator structure disposed about the rotor and including a pair of opposed salient stator poles of soft magnetic material and a pair of opposed salient stator poles of hardened magnetic material in magnetic flux relationship with the rotor, the hardened stator poles being angularly spaced from the soft stator poles, the stator poles being supplied with magnetic flux from the energizing winding such that, upon energization of said winding, the rate of flux build-up in the hardened poles is less than that in the soft poles, to provide the machine with a unidirectional starting characteristic, the magnetic stator flux from each of the soft stator poles following a nonmagnetic return which extends across said rotor directly to the other soft stator pole and then back through the housing and the surrounding atmosphere to the first soft pole.

10. An electric rotating machine comprising, in combination:
means including an energizing winding for producing magnetic flux;
bobbin means for supporting the energizing winding, the bobbin means having at least one flange portion and a central hub;
a housing of nonmagnetic, nonconductive material disposed about the energizing winding;
a cylindrical rotor having permanently magnetized north and south nonsalient rotor poles;
a plurality of reduction gears carried by the flange portion of the bobbin means in driven relationship with the rotor; and
a stator structure disposed about the rotor and including a pair of opposed salient stator poles of soft magnetic material and a pair of opposed salient stator poles of hardened magnetic material in magnetic flux relationship with the rotor, the hardened stator poles being angularly spaced from the soft stator poles, two of the stator poles having extensions thereon which form the electrical terminals of the machine, the stator poles being supplied with magnetic flux from the energizing winding such that, upon energization of said winding, the rate of flux build-up in the hardened poles is less than that in the soft poles, to provide the machine with a unidirectional starting characteristic.

11. An electric rotating machine comprising, in combination:
means including an energizing winding for producing magnetic flux;
bobbin means for supporting the energizing winding, the bobbin means having at least one flange portion and a central hub;
a housing of nonmagnetic, nonconductive material disposed about the energizing winding;
a cylindrical rotor having only a single pair of permanently magnetized north and south nonsalient rotor poles, the rotor having an axial length greater than its diameter;
a plurality of reduction gears carried by the flange portion of the bobbin means in driven relationship with the rotor; and
a stator structure disposed about the rotor and including only a single pair of opposed salient stator poles of soft magnetic material and only a single pair of opposed salient stator poles of hardened magnetic material in magnetic flux relationship with the rotor, the hardened stator poles being angularly spaced by approximately 90° from the soft stator poles, two of the stator poles having integral extensions thereon which protrude through the housing and form the electrical terminals of the machine, the stator poles being supplied with magnetic flux from the energizing winding such that, upon energization of said winding, the rate of flux build-up in the hardened pole is less than that in the soft poles, to provide the machine with a unidirectional starting characteristic.

* * * * *